United States Patent

Buckley

[11] Patent Number: 5,866,060
[45] Date of Patent: Feb. 2, 1999

[54] METHOD FOR MAKING PREFORMS

[75] Inventor: Daniel T. Buckley, Shrewsbury, Vt.

[73] Assignee: C. A. Lawton Company, DePere, Wis.

[21] Appl. No.: 401,996

[22] Filed: Mar. 10, 1995

Related U.S. Application Data

[63] Continuation of Ser. No. 446,859, Dec. 6, 1989.

[51] Int. Cl.$^6$ .................................................. B29C 35/08
[52] U.S. Cl. ......................... 264/463; 264/489; 264/490; 264/491; 264/493; 264/496; 264/119; 264/128; 264/257; 264/266
[58] Field of Search .................................. 264/490, 493, 264/496, 489, 463, 491, 257, 266, 109, 119, 128

[56] References Cited

U.S. PATENT DOCUMENTS

| | | |
|---|---|---|
| 2,560,903 | 7/1951 | Stiefel . |
| 2,865,790 | 12/1958 | Baer ..................................... 264/491 X |
| 3,097,125 | 7/1963 | Green . |
| 3,133,825 | 5/1964 | Rubens . |
| 3,207,819 | 9/1965 | Raddin et al. ....................... 264/491 X |
| 3,235,702 | 2/1966 | Timmermans et al. . |
| 3,271,220 | 9/1966 | Geen ..................................... 264/491 X |
| 3,277,580 | 10/1966 | Tooby . |
| 3,287,474 | 11/1966 | Harrington, Jr. . |
| 3,304,399 | 2/1967 | Timmermans et al. . |
| 3,321,605 | 5/1967 | Reker . |
| 3,356,781 | 12/1967 | Sulewski et al. . |
| 3,413,433 | 11/1968 | Timmermans et al. . |
| 3,449,836 | 6/1969 | Schreiber et al. . |
| 3,457,385 | 7/1969 | Cumming . |
| 3,463,894 | 8/1969 | Bleackley . |
| 3,471,672 | 10/1969 | White . |
| 3,474,210 | 10/1969 | Silbermann et al. . |
| 3,474,213 | 10/1969 | Hilton et al. . |
| 3,475,827 | 11/1969 | Goertz, Jr. . |
| 3,507,050 | 4/1970 | Smith et al. . |
| 3,566,447 | 3/1971 | Ogden . |
| 3,597,567 | 8/1971 | Johnson . |
| 3,622,733 | 11/1971 | Smith . |
| 3,632,945 | 1/1972 | Johnson . |
| 3,666,600 | 5/1972 | Yoshino . |

(List continued on next page.)

FOREIGN PATENT DOCUMENTS

| | | |
|---|---|---|
| 60-135230 | 12/1983 | Japan . |
| 59-133017 | 7/1984 | Japan . |
| 2 015 915 | 12/1975 | United Kingdom . |

Primary Examiner—Karen Aftergut
Attorney, Agent, or Firm—Hill & Simpson

[57] ABSTRACT

The method and apparatus for making a preform which is a rigid shaped item formed of glass fibers rigidly joined to each other where adjacent fibers touch. The interstices between the fibers are unfilled for the use of matrix resin to subsequently form a molded article. The preform is formed by shaping fibers into the preform shape, applying a binder to the fibers so that they are coated at the locations where they touch. The binder is sensitive or responds to the application of electromagnetic energy. In completing the preform after the application of the binder, the preform is subjected to electromagnetic energy so that the binder hardens to form a rigid preform. In one species form, the electromagnetic energy is applied in the form of microwave energy. The application of electromagnetic energy causes a reaction in the binder without requiring heating of the glass fibers so that the preforms can be rigidified rapidly and efficiently.

17 Claims, 5 Drawing Sheets

U.S. PATENT DOCUMENTS

| | | |
|---|---|---|
| 3,669,813 | 6/1972 | Andrea . |
| 3,676,537 | 7/1972 | Winstead . |
| 3,684,645 | 8/1972 | Temple et al. . |
| 3,765,998 | 10/1973 | Oswald et al. . |
| 3,790,744 | 2/1974 | Bowen . |
| 3,796,617 | 3/1974 | Wiltshire . |
| 3,801,396 | 4/1974 | Steenhoudt . |
| 3,802,307 | 4/1974 | Oggoian . |
| 3,850,723 | 11/1974 | Ackley . |
| 3,859,409 | 1/1975 | Coonrod et al. . |
| 3,878,019 | 4/1975 | Chapman et al. . |
| 3,922,426 | 11/1975 | Feltzin . |
| 4,012,553 | 3/1977 | Clemens . |
| 4,035,215 | 7/1977 | Goldstone . |
| 4,042,654 | 8/1977 | Leszyk et al. . |
| 4,054,713 | 10/1977 | Sakaguchi et al. . |
| 4,092,443 | 5/1978 | Green . |
| 4,101,254 | 7/1978 | Wiltshire . |
| 4,105,381 | 8/1978 | Platt et al. . |
| 4,146,417 | 3/1979 | Drelich et al. . |
| 4,208,562 | 6/1980 | Perreault . |
| 4,233,396 | 11/1980 | Armstrong et al. ............... 264/496 X |
| 4,252,592 | 2/1981 | Green . |
| 4,265,954 | 5/1981 | Romanek . |
| 4,269,581 | 5/1981 | Ury et al. . |
| 4,295,907 | 10/1981 | Cordts et al. . |
| 4,297,185 | 10/1981 | Chevreux et al. . |
| 4,352,769 | 10/1982 | Meyer . |
| 4,379,798 | 4/1983 | Palmer et al. . |
| 4,425,287 | 1/1984 | Hesse et al. . |
| 4,478,771 | 10/1984 | Schreiber . |
| 4,537,823 | 8/1985 | Tsang et al. . |
| 4,568,581 | 2/1986 | Peoples, Jr. . |
| 4,663,225 | 5/1987 | Farley et al. . |
| 4,692,291 | 9/1987 | Angell, Jr. . |
| 4,710,330 | 12/1987 | Lewandowski et al. . |
| 4,717,739 | 1/1988 | Chevreux et al. . |
| 4,741,873 | 5/1988 | Fischer et al. . |
| 4,762,740 | 8/1988 | Johnson et al. . |
| 4,772,438 | 9/1988 | Watanabe et al. . |
| 4,773,844 | 9/1988 | Bartels et al. . |
| 4,776,915 | 10/1988 | Natori . |
| 4,803,022 | 2/1989 | Barrell et al. . |
| 4,812,283 | 3/1989 | Farley et al. . |
| 4,822,434 | 4/1989 | Sawaki et al. . |
| 4,822,665 | 4/1989 | Scholz et al. . |
| 4,836,901 | 6/1989 | Manabe et al. . |
| 4,840,756 | 6/1989 | Ebersole et al. . |
| 4,863,538 | 9/1989 | Deckard . |
| 4,869,855 | 9/1989 | Twilley et al. . |
| 4,879,073 | 11/1989 | Kromrey . |
| 4,883,550 | 11/1989 | Overath et al. . |
| 4,883,552 | 11/1989 | O'Connor et al. . |
| 4,883,624 | 11/1989 | Spaay . |
| 4,892,764 | 1/1990 | Drain et al. . |
| 4,921,205 | 5/1990 | Drew, Jr. et al. . |
| 4,952,366 | 8/1990 | Gelin . |
| 4,986,948 | 1/1991 | Komiya et al. . |
| 4,988,469 | 1/1991 | Reavely et al. . |
| 5,002,476 | 3/1991 | Kerr . |
| 5,041,260 | 8/1991 | Johnson et al. . |
| 5,055,242 | 10/1991 | Vane . |
| 5,110,514 | 5/1992 | Soane . |
| 5,124,089 | 6/1992 | Ohkoshi et al. . |
| 5,169,571 | 12/1992 | Buckley . |
| 5,192,387 | 3/1993 | Buckley . |
| 5,217,654 | 6/1993 | Buckley ............... 264/496 X |
| 5,217,656 | 6/1993 | Buckley et al. ........ 264/490 |
| 5,318,650 | 6/1994 | Kerawalla ............ 264/490 X |
| 5,332,536 | 7/1994 | Boeckeler ............... 264/496 |
| 5,338,169 | 8/1994 | Buckley ............... 264/489 X |
| 5,382,148 | 1/1995 | Buckley ............... 264/496 X |
| 5,487,853 | 1/1996 | Buckley . |

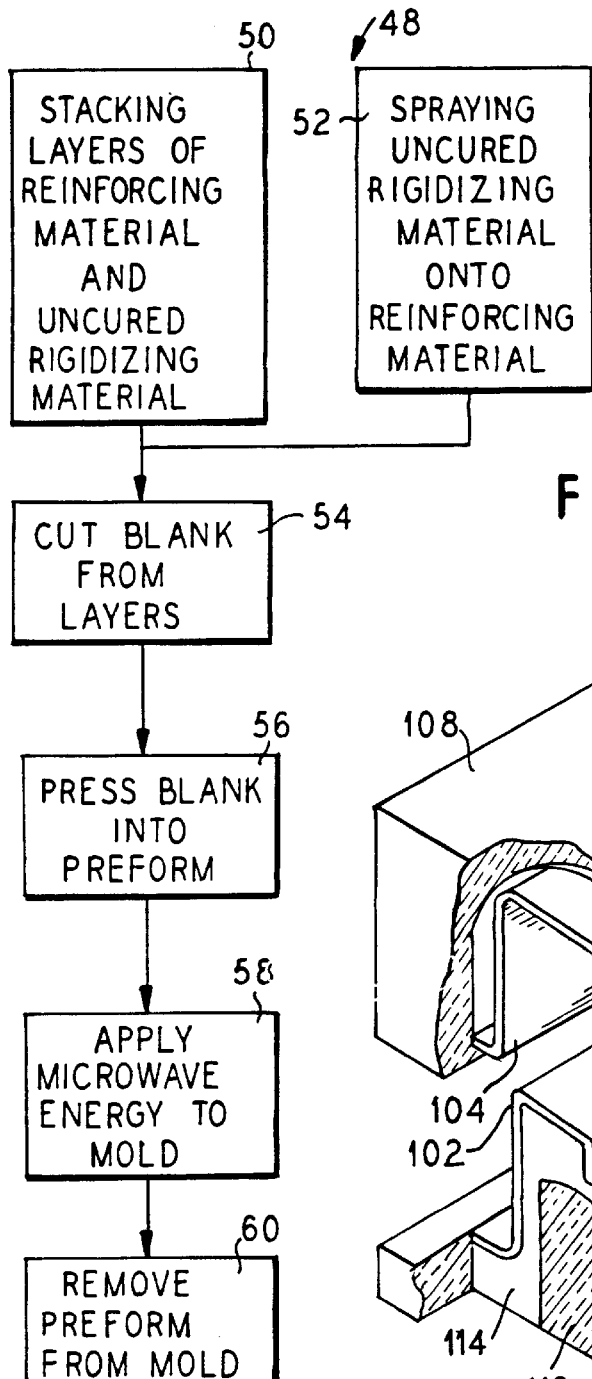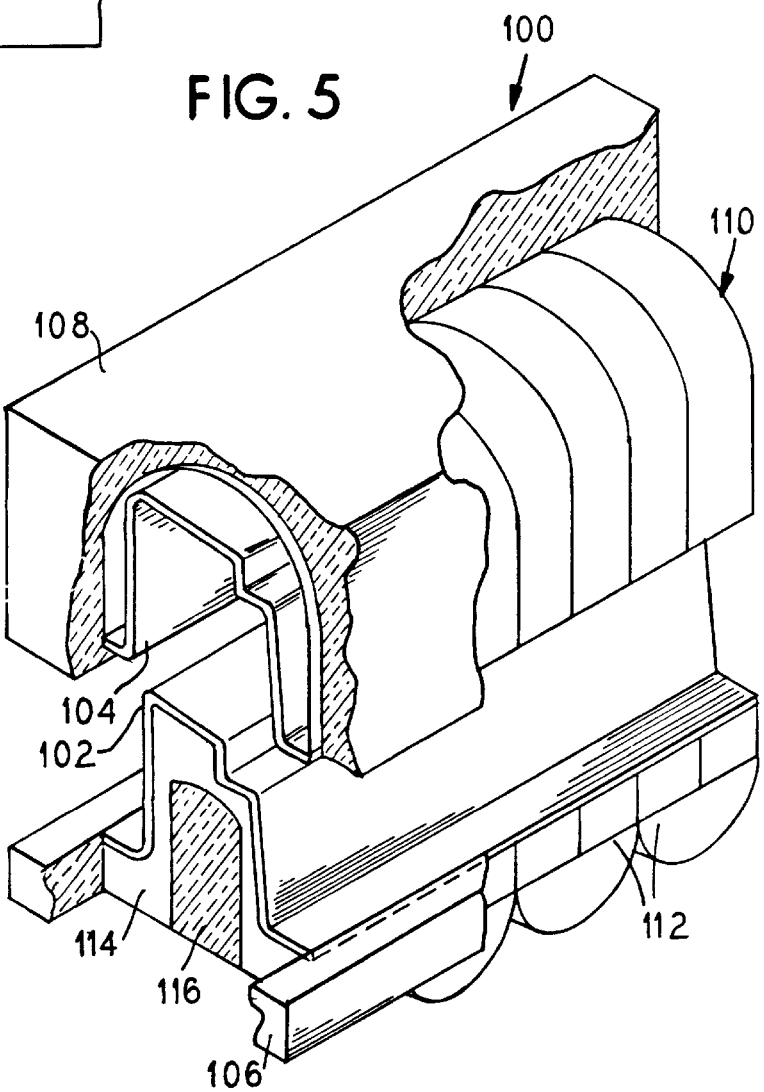

METHOD FOR MAKING PREFORMS

This is a continuation of application Ser. No. 07/446,859, filed Dec. 6, 1989.

BACKGROUND OF THE INVENTION

1. Field of the Invention

The present invention is related to a method and to an apparatus for making structural reinforcement preforms for resin transfer molding (RTM) and reaction injection molding (SRIM) processes for structural composites. In the present transfer molding or injection step, the previously formed preform is subject to a deformable plastic material filling the interstices between the fibers of the preform and the plastic material is hardened to form a structural composite comprised of the injected plastic in the interstices and the fibers.

2. Description of the Prior Art

In making directed fiber preforms, it has heretofore been the practice to spray chopped fibers with a binder resin onto a form that has air pulled therethrough to locate and hold the fibers. The form with the fibers and the binder resin is then rotated into a hot air plenum chamber, dried and/or cured to set the binder resin. In addition, a great deal of storage space is required for the preforms for drying and curing. In making thermoformed preforms, it has heretofore been the practice to use a continuous strand fiber mat that has been previously coated, by the fiber manufacturer, with a thermoplastic binder. The thermoformable mat is supplied in a roll form whereby it is unrolled into flat sheets of varied layer thicknesses and clamped into a holding frame at the edges. The frame network is then positioned in an oven chamber containing radiant heaters which slowly heat the reinforcement mat and thermoplastic binder from both sides. Upon heating, the thermoplastic binder softens, and, while soft, the frame network is quickly transferred onto a cold mold. The mold closes via a press forcing the reinforcement mat into the shape of a part. Upon cooling, the thermoplastic binder stiffens and thus holds the thermoformable mat in its new shape. The processes described are slow, require a great deal of space and require a large amount of energy. In practicing the present invention, the preforms can stay in the manufacturing location and leave only when they are cured. The present invention is more energy efficient in that the binder resin only is heated using the energy for curing. The reinforcement will not be heated, nor will the forms. There is therefore no requirement of large rooms with constantly operating ovens. The process is extremely fast with the cure range being in seconds, rather than hours. The process is environmentally safer in that there are few volatiles required and none are driven off as in a system requiring heated ovens.

In conventional RIM/SRIM process applications for structural components, fiber layer thickness across the entire preform is increased to meet the strength requirements of one area which results in unnecessary use of material and increased thickness and weight. Also, neither the directed fiber process nor the process using thermoformable mat allows a designer to add ribs or closed sections to maximize design properties.

Thermoforming and directed fiber processes are slow, cumbersome and wasteful of energy and material.

It is known in the art to apply electromagnetic energy to affect elements in processes, such as the use of ultraviolet radiation and microwave radiation.

As a specific example, it is well known to employ microwaves for generating heat, as in conventional microwave ovens. Many applications for microwave heating have been developed including U.S. Pat. No. 3,597,567, U.S. Pat. No. 2,560,903 and U.S. Pat. No. 3,277,580 for drying paper, textiles, veneers, foods, pharmaceuticals and the like. Such techniques may be employed in practicing the present invention and are incorporated herein by reference. Air flow has also been incorporated in such systems for removing moisture created as steam in the drying process.

SUMMARY OF THE INVENTION

The object of the present invention is to provide a new and improved method and apparatus using directed energy for manufacturing structural reinforcement preforms for resin transfer molding (RTM), resin injection molding (RIM) and structural reaction injection molding (SRIM) processes.

Another object of the invention is to provide a process which is energy efficient, logical, basically simple and permits maximum usage of material with the lowest possible waste.

Still another object of the invention is to provide freedom for a designer to include ribs, closed sections, cores, encapsulations of metal, foam wood or other materials in the design of preforms.

According to the present invention, a process is designed for high speed high-volume output of rigidized composite forms that will allow unlimited geometric configurations and detailed assemblies utilizing a wide variety of reinforcement materials. Along with numerous fiber reinforcement materials, components such as structural foam, wood or metal can be utilized to achieve any shape or structure.

The process of the present invention utilizes specifically developed binders along with directed energy systems for rigidizing the composite forms and attaching structural components to the preforms through energetic stitching techniques. The process capabilities and binder systems apply to and are compatible with RTM and RIM resin systems, i.e. polyesters, vinyl esters, urethanes, epoxies, phenolics and acrylics.

The process of the present invention is designed to be fully automated and to enable specific distribution and placement of numerous types of reinforcements, where necessary, for the required structural properties of a preform. Complete freedom of design is therefore inherent in the process and allows for the most desirable reinforcement type and/or structures including closed structural shapes and varied wall sections to meet design criteria. The process of rigidizing and/or attaching component structures can be incremented and tailored to the cycle time of the molding machine or supply a variety or plurality of the preforms to more than one molding machine.

Automation of the process is designed to make full use of statistical processing techniques to produce preforms of repeatable, consistent quality and structural integrity. Application of the process technology can be integrated into a wide variety of product areas such as marine, aircraft, aerospace, defense and sporting, and in consumer goods.

As will be set forth in detail below, engineered polymer resin chemistry along with directed energy systems are used in conjunction with specially designed automation machines for the manufacturing of structural carrier preforms. The preforms can be tailored for specific structural and size requirements necessary for RTM and SRIM components.

Major problems with placement of reinforcements during preforming and molding can be overcome by combining and rigidizing various reinforcement materials to conform to any complex shape desired. According to a feature of the invention, the utilization of other reinforcement materials can be consolidated with the preform structure by addition of stiffeners or ribbing and encapsulation of core materials along with inserts can be achieved where reinforcement for structural as well as class A applications are required.

In practicing the invention, the mats of fiberglass reinforcement material are precut to conforming shapes as blanks, binder is applied and each blank is then transferred into a specifically engineered mold set that replicates the shape of a part and directs energy to the preform binder. Energy is applied for a few seconds to activate the binder, in turn rigidizing the preform. When activation energy is discontinued, the mold sets are opened and the preform is transferred to a molding station or to an optional energetic stitching station.

The preformable reinforcement mat is cut into predetermined patterns that allow it to conform to the contours of the forming mold. The reinforcement is permeated on either side with the binder resin. Single or multiple layers of reinforcement mat are sandwiched together to necessitate the carrier preform loading. Carrier preform is a term coined by the C.A. Lawton Company to describe a preform in a process that will be used as a subassembly or have reinforcement subsequently attached thereto by energy stitching to create the final assembly. Energetic stitching is a term coined by the C.A. Lawton Company to describe the method of placing and attaching structures to a basic preform. The binder resin is promoted with a catalyst (microwave system) or used as supplied for an ultraviolet system and is metered into the applicator system. In applying the binder, the binder resin can be sprayed, rolled or calendered as a film. After application of a binder, the reinforcement mat is mechanically loaded onto a matched half of the forming mold (male or female).

The mold is shuttled into a forming press and connected to a directed energy source. The forming press closes to form the reinforcement mat into the desired shape. While closed, ultraviolet or microwave energy is applied to the forming molding therefore rapidly curing the catalyzed binder resin. The binder resin, in curing, polymerizes to a rigid mass allowing the preform to retain the shape of the forming mold. When the energy is discontinued in a system in which the binder generates heat for the reaction or is exothermic, the glass reinforcement acts as a heat sink allowing the preform to cool. Heating of the glass is minimal since it does not absorb energy from the input power, but only from the heat given off from the binder reaction. Heating of the mold surface is therefore also minimal.

A reinforcement mat no longer has to be heated, stretched and cooled to conform to the shape of the carrier preform. Sections can be added where needed and rigidized into place by chemical stitching techniques, herein also referred to as the above-mentioned energetic stitching.

Conventional preforming processes are presently being improved with automation, but generally continue to be operator dependent. The present invention is designed for a turnkey industrial manufacturing process with a high level of automation. With the use of automation/robotics, the glass distribution becomes highly uniform and repeatedly consistent, making all aspects of the process statistically controllable.

After the rigidizing cycle, the forming press is opened and the mold shuttled out where the carrier preform is mechanically unloaded and transferred to other processing locations for insert applications or molding. In conventional RTM/SRIM molding process applications for structural components, fiber layer thickness is adjusted to withstand strength requirements. The energetic stitching process allows for adding reinforcement materials selectively and specifically into high stress areas without increasing overall thickness and weight. The process of the present invention therefore lends itself to two types of stitching techniques, microwave and ultraviolet. Applications of inserts, closed sections and/or cores to the carrier preform can be processed with the use of energetic stitching techniques. Precut sections of reinforcement materials can be tack welded into place using secondary microwave or ultraviolet energy applicators. When using microwave energy, the carrier preform with the added reinforcement and binder can be shuttled back into the forming press or into a secondary clamping device that holds the material in place while energy is applied. Similarly, with the ultraviolet stitching process, reinforcement is pressed into place, a special UV-sensitive binder resin is applied in specific spot locations and then ultraviolet energy is applied to cure the binder resin.

The finished preform can be transferred to a holding area or directly to the molding operation. Since rigidizing of the preform is faster than the molding cycle, various forming molds can also be set up in the rigidizing process, thus allowing for numerous preform shapes to be made to supply other molding stations.

Material factors are extremely important to effectively achieve the rigidizing process. In microwave applications, a composite material with very low electrical loss is necessary for the mold surface. Materials used for the mold cannot be affected by the microwave energy and the energy required to rigidize the preform cannot be absorbed by the mold material. The mold material also requires good thermal stability with respect to heat produced by the preform binder. Although the heat produced may be minimal, repetitive cycling may cause significant heat generation. On the other hand, the materials used as a rigidizing binder are high in electrical loss properties in response to microwave energy and therefore extremely effective for this process.

In order to facilitate the directed energy preforming system, a suitable binder system is required. Typical standard binders used in conventional preforming usually are either thermoset polyesters or are various thermoplastic polymers. For the directed energy process, the requirements are more stringent. If a thermoplastic binder were to be used in the carrier preform, it would likely soften and release when the directed energy was re-applied during addition of fiber inserts to further strengthen various areas of the part to be molded. Therefore, in some cases, a thermoplastic binder would be acceptable for attachments, but not for the main carrier preform. For this a thermosetting polymer is necessary. Additional requirements are also necessary. The binder must be compatible with various matrix resins that will be used with preforms. This includes polyesters, vinyl esters, polyurethanes, polyisocyanurates, polyureas, IPN's, and polyester/urethane hybrids (and possibly epoxies). It would be especially useful if the chemistry could be used for all of the potential matrix resins. In addition to the above requirements, the binder for this process must be highly active in response to the directed energy. Here, the binder was specifically structured chemically thus rendering itself of being highly active in response to the applied energy such that substantially all of the binder is cured to form an essentially rigid preform It is important that when the energy is applied, the binder is activated and cures within a few seconds. Since heat can be a part of the curing process, the heat must be generated rapidly when the energy is introduced, but heating must cease instantly when the energy is terminated. If a binder system is selected which generates heat for the reaction or is exothermic, the reinforcement will act as a heat sink, preventing the preform itself from heating appreciably. Since heating of the mat is not a requirement in this process, as it is with thermoforming types, the reinforcement with the applied binder can be drawn into shape prior to activating the binder system. It is further required that additional application of the directed energy after cure is complete will result in no further activation of the binder, or at least will not degrade or release the bonding properties. of the binder in the essentially rigid preform. After rigidizing, the binder in a cured state becomes sufficiently transparent to the applied energy so as to prevent degradation and loss of its rigidizing ability. This is particularly important for adding inserts. Most thermosetting polymeric binders that are highly active to directed energy tend to be highly active in the early stages of curing, but of decreasing activity as curing continues. It is therefore difficult to get a complete cure, because the polymer stops absorbing energy. Air inhibition also affects the completion of cure. Since the cure is incomplete, bonding sites for the matrix resins are available and result in enhanced physical properties when the molding is complete. Other thermosetting polymeric binders are highly active throughout the curing process and where volatile additives, such a monomers, are employed, excessive heating and degradation of the binder's bonding abilities occur.

In the case of a microwave directed energy system, reaction temperature of the binder resin is designed for low temperatures, but sufficiently above ambient to allow adequate process shelf life when promoted. Localized and directed heating from the energy source can achieve temperatures in excess of 300° F. which is sufficient for completion of cure. A special binder developed for use in practicing the present invention in the microwave technique is known as Stypol XP44-AB12-51B of Freeman Chemical Corp. This is a diluted version of the Freeman 44-7010 binder. This binder has the necessary curing characteristics under the applied energy, proper chemistry to be compatible with all required matrix resins, good adhesion not only to glass fibers but also to most organic reinforcing fibers, excellent binding properties and making preforms that are rigid. The binder is also compatible with additional binders used in adding fibrous component inserts.

Glass fibers in the form of a mat for carrier preforming is ideal for load-bearing parts. Continuous strand preformable mat lends itself to readily conforming to the part configuration during the forming process and may advantageously be used in making the preforms.

Multiple plies of reinforcement mat can be formed into desired shapes simultaneously. Other types of reinforcement materials may be encapsulated for stiffening, ribbing and attached components using the energetic stitching process. These types of reinforcement materials, fibrous, metallic and/or light-weight structural foams and low density cores can be added at the onset of the loading and shaping process as part of the carrier preform or as a secondary operation where placement of insert materials are necessary for the preform structure.

When using the mat material in conjunction with unidirectional fabrics or other reinforcements in specific locations, optimum reinforcement structures of high fiber content can be attained while maintaining a rigid form for easy handling and permeation of resin systems into the interstices among the fibers of the mat during molding operations.

Placement of reinforcements into specific locations allows fiber orientation where needed to obtain required strengths of the molded product.

In practice tests, two directed energy power sources have been used, both separately and in conjunction with one another.

The directed energy power source employed in practice tests is a 0–6 kW microwave generator operating at 2450 MHz; for ultraviolet systems, a commercially available ultraviolet radiation source was used. The power level requirement depends upon the size of the forming tool relative to the mass of material loading. Initial power level calibrations are required to optimize the rigidizing cycle time. Power output and reflected energy level are controlled. For larger tooling that requires higher power, additional generators can be added. Power ramping for decreasing power can be utilized to compensate for the binder curing process since during reaction the binder become somewhat transparent to the energy field and therefore does not require full output power. The power ramping also extends generator life and prevents power surges.

Directed energy for energetic stitching and reinforcement inserts consists of either a localized microwave energy application or an ultraviolet energy system to direct the energy to specific locations of the preform to induce polymerization of the stitching binder resin.

For ultraviolet curing systems a similar mold construction is used, except that the ultraviolet radiation source is contained within the body of the preform mold behind the mold surface. The mold surface can be constructed of metal screen, clear acrylic or other rigid materials, that will allow the ultraviolet radiation to pass through and into the preform. A material such as clear acrylic is desirable because it can be thermoformed into complex shapes inexpensively and is easily replaced when wear is evident.

Specifically designed composite tools are used to form the shape of the preform. For more complex shapes, combinations of preform molds can be used simultaneously with the same energy source or several shapes independently formed (sub assemblies) and later combined in the overall preforming operation with energetic stitching. The tools are designed not only to form the shape of the preform, but also to specifically direct the energy into the reinforcement containing the binder. The key to this design depends upon placement of the preform section in a region of highest curing energy intensity and the proper tool construction to uniformly distribute the energy waves. In order to effectively achieve the uniformity of the directed energy in the microwave technique, three-dimensional conforming waveguides are placed directly into the mold design to produce multiaxial wave forming. Since waveguides consist of a channel having a specific cross-sectional dimension where the maximum energy is at the center, the waveguide is split and each half placed at the surface of the corresponding half of the mold. In order to achieve a resonance in the waves without moving the waveguides or the material, the contours of the mold design produce serpentine patterns. It is also important to maintain proper cross-sectional dimensions within the bends of the waveguide. Fabrication of the bends must be carefully considered to achieve optimum performance. Each half section of the waveguide will consist of three sides made of a metallic material with the fourth side, facing the preform material, consisting of a material that is transparent to the microwaves and acts as the mold surface. The cavity of the mold or the spacing between each corresponding half of the waveguide section must be designed to prevent loss of stray energy and assure proper cross-sectional dimensions of the waveguide. Toward the center of the mold surface area, the spacing can be increased to allow cross-resonance of the waves.

BRIEF DESCRIPTION OF THE DRAWINGS

Other objects, features and advantages of the invention, its organization, construction and operation will be best understood from the following detailed description, taken with the foregoing discussion and in conjunction with the following detailed description with reference to the drawings, in which:

FIG. 3 is a block diagram flow chart setting forth the basic method of the invention;

FIG. 5 is a perspective exploded view of a tool which may be employed in practicing the present invention;

DESCRIPTION OF THE PREFERRED EMBODIMENTS

Figure 1:
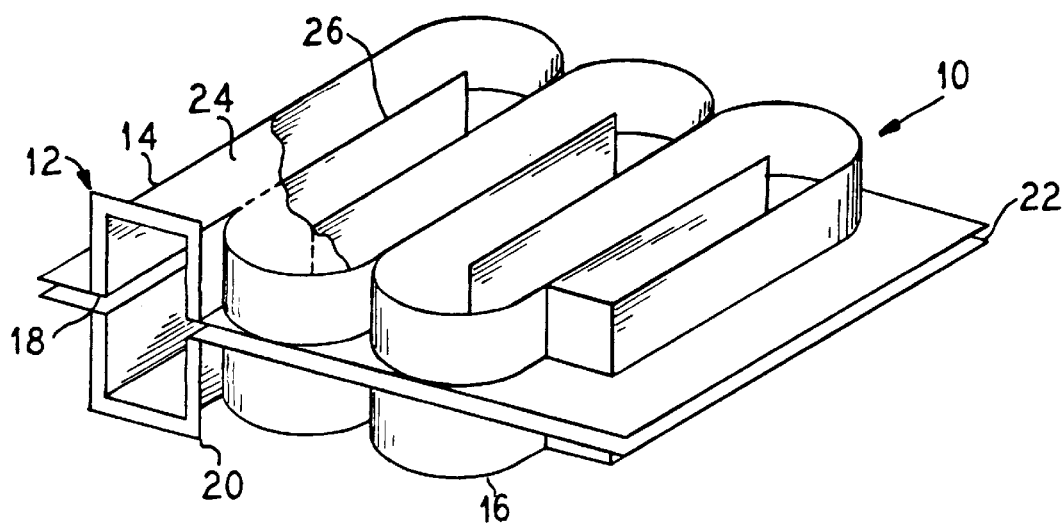
FIG. 1 is a perspective view of a split serpentine waveguide sandwiching a composite material to be cured.

Referring to FIG. 1, a basic tool is generally illustrated at 10 as comprising a split serpentine waveguide 12 including an upper section 14 and a lower section 16 which are basically mirror images of each other and which are separated by a gap 18 and are provided with a microwave input coupling 20. The waveguide 14 comprises a top wall 24 and sidewalls 26 forming the serpentine structure. A composite material in the form of a web 22 is located in the gap 18 for the application for microwave energy thereto.

A structure of the type which was employed for testing the invention is generally illustrated at 28 as comprising a split microwave waveguide 30 having an upper section which comprises a sidewall 32 and a top wall 34. The sidewalls 32 are shaped to conform to the profile of a mold as illustrated at 36 and 38, the mold includes an inner surface 40 and an inner surface 42 which conform to the shape of a preform to be molded. The material carrying the surfaces 40 and 42 and any support material between those surfaces and the waveguide are transparent to microwave energy. The waveguide is provided in sections which include couplings to each other and for the input of microwave energy as illustrated at 44. The composite material of reinforced material and binder resin is shown between the surfaces 40 and 42 at 46. With the composite material 46 loaded into the mold portion of the tool, microwave energy is applied to activate the binder resin for curing.

Turning to the flow chart of FIG. 3, a typical process for practicing the invention is illustrated at 48 as comprising a step 50 of stacking layers of reinforcing material (fiberglass mat) and uncured rigidizing material (binder resin) in which the layers are formed by applying binder resin to the reinforcement material or, in the alternative, the step 52 of spraying uncured rigidizing material to a degree sufficient to coat the fibers of the mat without the filling interstices between the fibers onto a mat of reinforcing material. Next, blanks are cut at 54 to conform to the shape of a planar development of the preform. At 56, the blank is pressed in the mold into the shape of the preform and microwave energy is applied at 58 to cause curing of the binder.

At 60, the binder is cured and rigid, and the rigidized preform may be removed from the mold.

Figure 4:
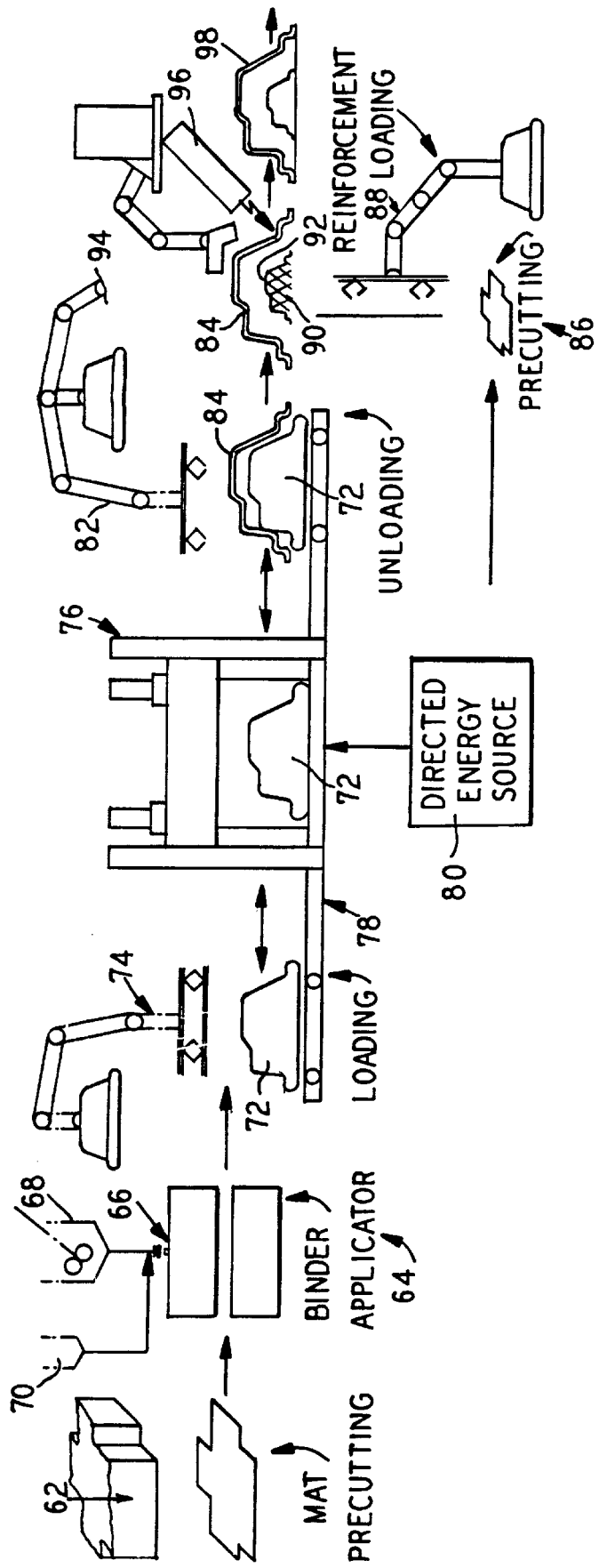
FIG. 4 is a schematic representation of an automated process for practicing the present invention.

FIG. 4 illustrates a similar process using robots for handling the material between processing stations.

Figure 2:
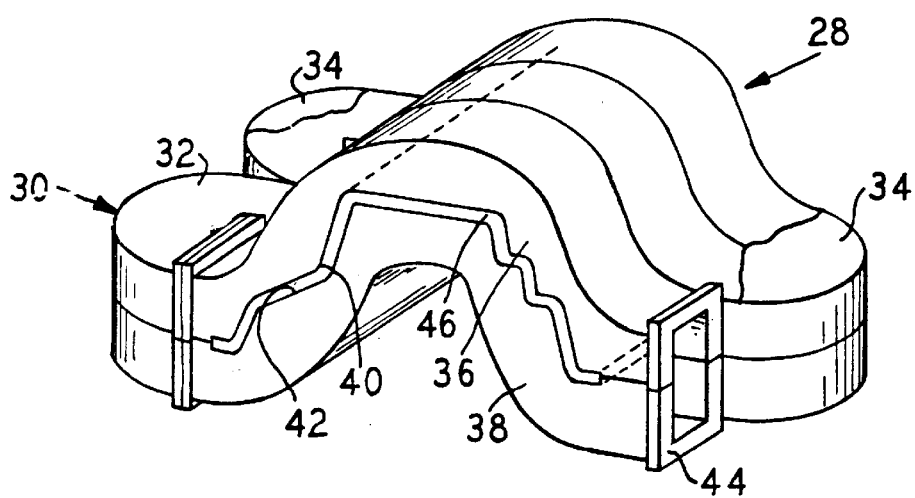
FIG. 2 is a perspective view of a tool constructed in accordance with the present invention and comprising a separable mold of two parts, each part carrying a respective section of a split serpentine waveguide.

In FIG. 4, the first step is to precut a reinforcement material mat to conform to the developed shape of a preform, as indicated by the die cutter 62. This is an alternative to the initial portion of the process set forth in FIG. 3. After the mat is cut at 62, a binder is added at 64 in a binder applicator 66 which comprises a source of binder resin 68 and a source of a catalytic promoter 70. As mentioned above, the binder may be applied in the binder applicator 66 by spraying, rolling or calendaring to a degree sufficient to coat the fibers of the mat without filling the interstices between the fibers. Next, the composite blank of reinforcement material and binder is transferred from the binder applicator to a mold 72 by a robot 74. The mold 72 may be of the type illustrated in FIG. 2 such that the composite blank is positioned on the male portion of the mold as indicated at 42, 46 of FIG. 2. Returning to FIG. 4, the mold 72 is then moved along a shuttle 78 to a press 76 where the two halves of the mold are pressed to replicate the desired shape of the preform and energy is applied from a directed energy source 80 such as a source of microwave energy.

Next, the mold 72 is unloaded by moving the same along the shuttle 78 to a position where a robot 82 unloads the cured preform 84. Here, the preform becomes a carrier preform in that reinforcement is to be added in the form of a reinforcing structure. The robot 82 will then stack the preform for short term storage or move it directly into the energetic stitching process.

When elements are to be stitched to the carrier preform, the reinforcement material is precut, as before, at 86 and a robot 88 positions the precut material over a former 90 so that it takes a reinforcement shape 92. A robot 94 then retrieves a preform 84, now a carrier preform, and places the same over the formed element 92. There will be points, not shown, that the carrier preform 84 and the formed element 92 engage in intimate contact. When the energetic stitching process utilizes microwave energy, the element 92 comprises a binder resin. When the energy stitching process relies on ultraviolet energy, an ultraviolet sensitive binder resin is applied at specific spot locations where the elements 84 and 92 are in intimate engagement. Ultraviolet energy is then applied to cure and bond. In either case, a directed energy source 96 is then employed to cure the binder and bond the two elements together to form a reinforced structure 98. The structure 98 is then transferred to a molding process for molding of the finished structure.

As may be appreciated from the foregoing, attachments may be bonded to a carrier preform to increase structural strength of the molded end product or to add attachment devices for the molded end product by the energetic stitching of elements to the preform. It is not necessary that one element to be attached to another be made by the same energy directed process, or at all by an energy directed process. One element may be attached to another by the application of a microwave-sensitive or ultraviolet-sensitive binder resin and the application of the corresponding energy to cure that binder resin. Therefore, this flexibility is an advantage of the energetic stitching process in that a preform made by the microwave technique may have a reinforcement element by energetic stitching using the ultraviolet technique and vice-versa. Also, elements such as wood, steel, carbon black and the like may be attached to a preform by using either technique in combination with the appropriate binder resin.

In FIG. 5, a tool is illustrated at 100 as comprising a pair of separable mold sections including a shaped member 102 having a shaped member 104 complementary thereto. The shaped members 102, 104 are made of a microwave transparent material and form the inner surfaces of a mold cavity. The remainder of the mold is formed thereover and may comprise, an outer layer 106, 108, a plurality of waveguide sections 110 connected into a serpentine waveguide by way of a plurality of radius sections 112. When the two sections are brought together, a complete waveguide is formed and there is a space between the layers 102 and 104 defining the mold cavity. As indicated at 114, 116, the mold may include support material, such as wood, foam or resin.

Mention has been made above of the use of ultraviolet energy in making a preform. This technique is generally similar to the microwave technique in that ultraviolet light sources are placed in the tooling to direct ultraviolet radiation toward fiber reinforcement preforms to form rigidize structures. Glass fiber reinforcement material containing a rigidizing binder resin is placed between two matching half sections of a tool. When ultraviolet radiation is applied, the binder resin undergoes molecular polymerization forming a rigid product that allows the glass fibrous material to be held to the conforming shape of the tool.

Similarly to the microwave technique, a binder resin that is molecularly sensitive to ultraviolet radiation is applied to glass fiber reinforcement material. The reinforcement material, in turn, is placed into a forming mold that is fabricated to conform to the shape of a finished part. When joining the two half sections of the forming mold, the fibrous material conforms to the shape of the mold. The surfaces of the corresponding halves of the shaping mold in contact with the fibrous material are made of a material that transmits ultraviolet radiation. This material can be a solid transparent acrylic type thermoplastic or a metal wire mesh screen. The ultraviolet light source is therefore placed within the tooling structure to direct the radiation through the mold surface and at the fibrous material. For simple tooling, the light source is placed into an open chamber below the mold surface. For more complex preform shape requirements, where structural support to the mold surface is required, ultraviolet light sources are placed in multiple chamber sections and energize simultaneously to perform the rigidizing operation.

We have found that certain binder resins may be employed in the ultraviolet technique. These are available from Freeman Chemical and are known as 80497 (slow system), 747-10 (medium system) and 19-4837 (fast system). Application is similar to that in the microwave technique.

Figure 6:
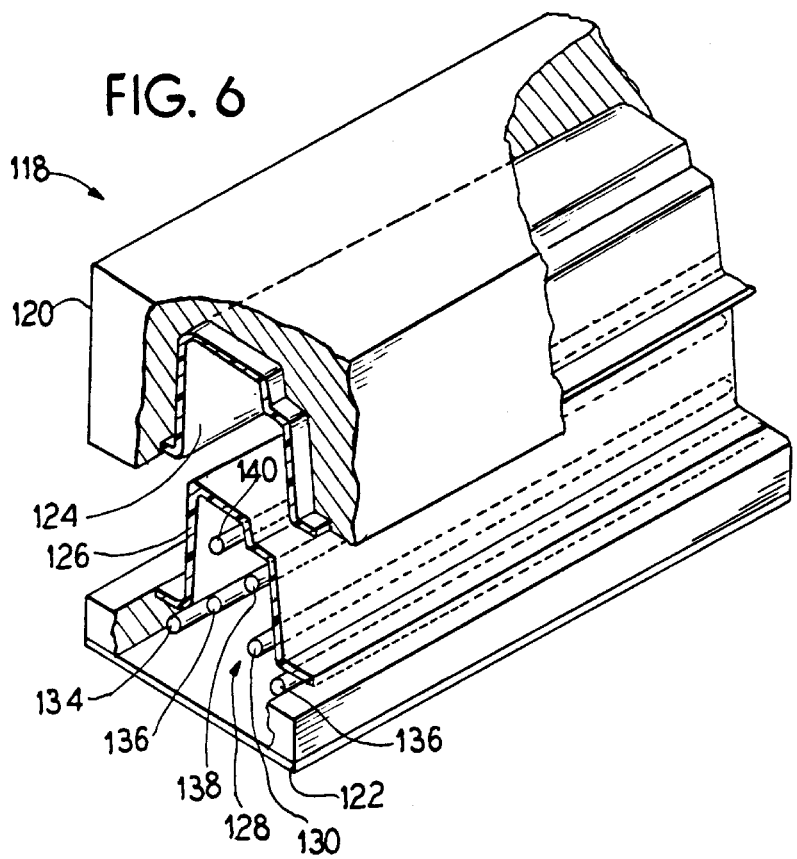
FIG. 6 is a fragmentary perspective view of a tool constructed in accordance with the present invention and comprising a separable mold of two parts for operation to rigidize a binder resin by irradiating a blank with ultraviolet energy from sources mounted within one of the parts.

Referring to FIG. 6, a tool for the ultraviolet process is illustrated at 118 as comprising an upper mold part 120 and a lower mold part 122. The mold surfaces are respectively shown at 124, 126. A chamber 128 is formed by the mold part 126 in the lower mold part 122 and has mounted therein a plurality of ultraviolet sources 130–140.

Figure 7:
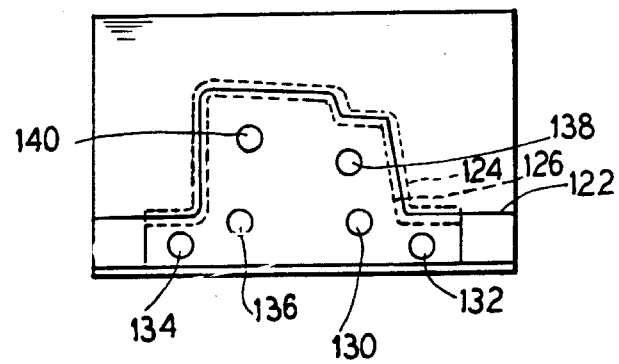
FIG. 7 is an end view of the tool of FIG. 6.

With the mold closed, as illustrated in FIG. 7, a composite material is made to conform to the shape defined by the mold surfaces 124, 126 and is rigidized in that shape by the application of ultraviolet energy from the sources 130–140.

Figure 9:
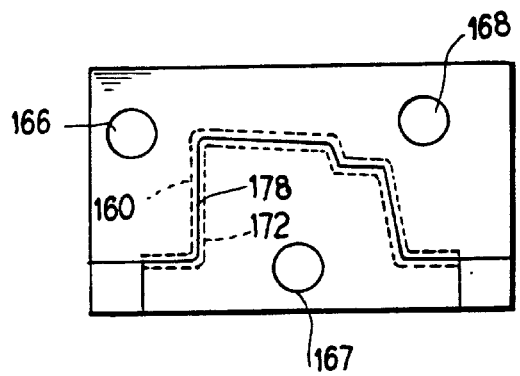
FIG. 9 is an end view of the tool of FIG. 8.
Figure 8:
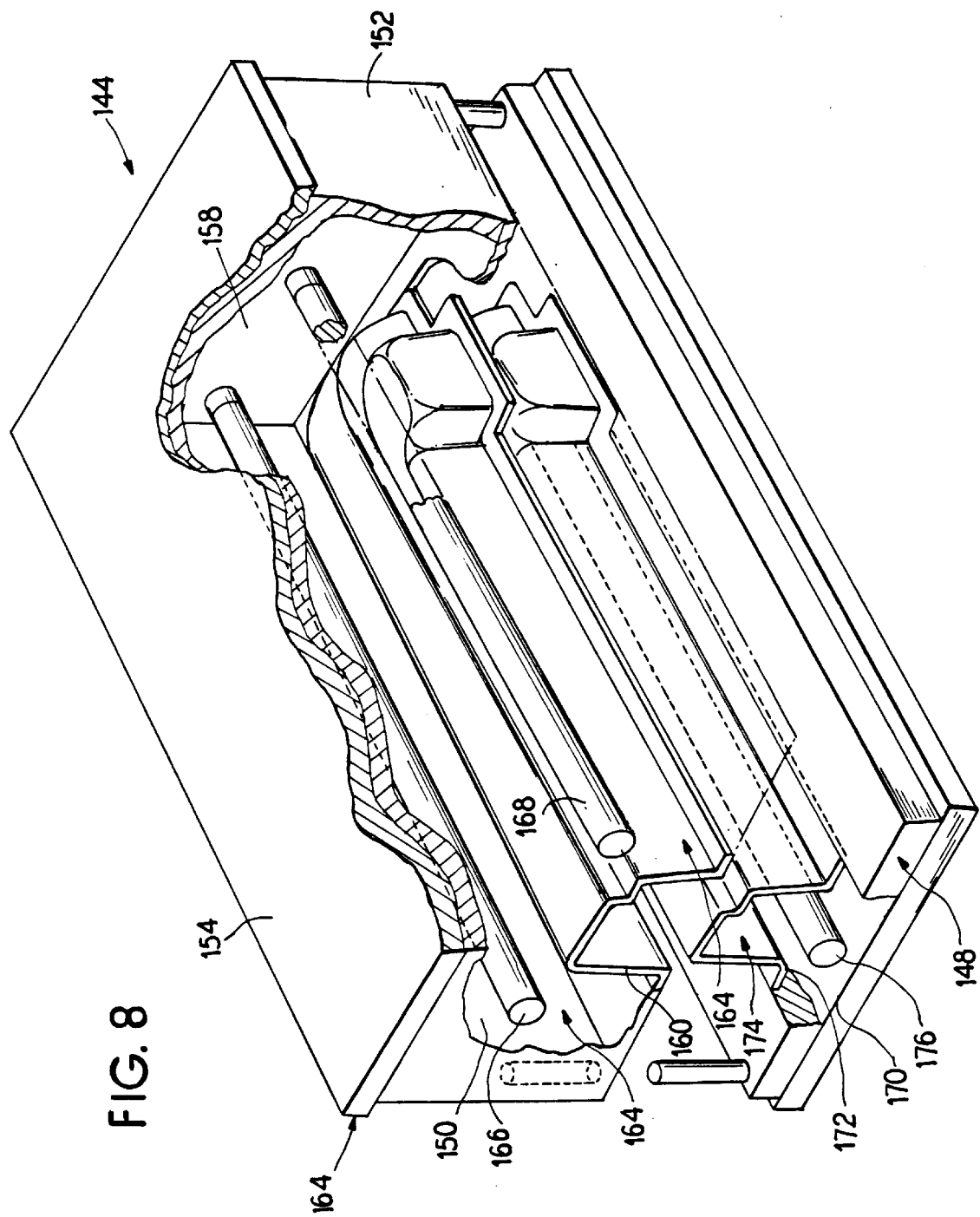
FIG. 8 is a fragmentary perspective view of another embodiment of a tool constructed in accordance with the present invention and comprising a separable mold of two parts for rigidizing a binder resin in response to ultraviolet energy provided by sources mounted in each of the mold parts.

Referring to FIGS. 8 and 9, another tool is illustrated at 144 as comprising an upper mold part 146 and a lower mold part 148. As seen, the upper mold part comprises a sidewall 150, a sidewall 152, an upper wall 154 and an inner wall which is completed by a mold wall 160. In the lower tool part 148, there is a lower wall 170 and an inner wall which is completed by the mold wall 172.

In the uppermost part, the walls generally define a chamber 164 on both sides of the mold wall 160. Ultraviolet sources 166 and 168 are mounted in the chamber 164. In the lowermost part 148, the bottom wall 170 and the mold wall 172 define a chamber 174. An ultraviolet source 176 is mounted in the chamber 174.

When the mold is closed, as illustrated as being closed along the parting line 178 in FIG. 9, a composite material may be subjected to ultraviolet radiation by way of the ultraviolet sources 166, 168 and 176.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

What is claimed is:

1. A method of making a fiber reinforced preform comprising:

forming reinforcing fiber into a shaped structure;

coating the reinforcing fibers with an electromagnetic energy curable composition to a degree sufficient to coat the reinforcing fibers without filling interstices among the reinforcing fibers;

and exposing the coated reinforcing fibers to electromagnetic energy to cure substantially all of the composition to form the preform.

2. A method of making fiber reinforced plastic molded articles comprising:

applying a layer of reinforcing fibers on a preform mold surface which has a configuration corresponding to at least a portion of a final molded article;

coating said fibers with an electromagnetic energy curable composition to a degree sufficient to coat said fibers without filling interstices among said fibers;

exposing said coated fibers to electromagnetic energy to cure substantially all of said composition to form an essentially rigid preform;

removing said essentially rigid preform from said preform mold surface;

placing said preform and a deformable plastic material in a mold;

molding said preform and said deformable plastic material together to form an article comprising said plastic material with said fibers contained therewithin as a reinforcement; and removing said fiber-reinforced plastic article from said mold.

3. A method according to claim 2, wherein:
said reinforcing fibers are pre-coated with said electromagnetic energy curable composition prior to being applied to said preform mold surface prior to exposure to said electromagnetic energy.

4. A method according to claim 2, wherein:
said preform mold surface comprises an electromagnetic energy transmittent material having a shape conforming to that of the preform shape.

5. A method according to claim 2, wherein:
said preform mold surface comprises a mandrel around which said fibers are deposited.

6. A method of making a rigid fiber reinforced preform for use in making fiber-reinforced molded articles comprising:
applying a layer of reinforcing fibers on a preform mold surface which has a configuration corresponding to at least a portion of a final molded article;
coating said fibers with an electromagnetic energy curable composition to a degree sufficient to coat said fibers without filling interstices among said fibers;
exposing said coated fibers to electromagnetic energy to cure substantially all of said composition to form an essentially rigid fiber reinforced preform; and
removing said essentially rigid fiber reinforced preform from said preform mold surface.

7. A method according to claim 6, wherein:
said reinforcing fibers are precoated with said electromagnetic energy curable composition prior to being applied to said preform mold surface and prior to exposure to said electromagnetic energy.

8. A method according to claim 6, wherein:
said preform mold surface comprises material which allows electromagnetic energy to pass therethrough having a shape conforming to that of the preform.

9. A method according to claim 6, wherein:
said preform mold surface comprises a mandrel around which said fibers are deposited.

10. A method of making fiber reinforced molded plastic articles comprising:
applying a layer of reinforcing fibers on a preform mold surface which has a configuration corresponding to at least a portion of a final molded article;
coating said fibers with microwave curable composition to a degree sufficient to coat said fibers without filling interstices among said fibers;
exposing said coated fibers to microwave energy to cure substantially all of said composition to form an essentially rigid fiber reinforced preform;
removing said essentially rigid fiber reinforced preform from said preform mold surface;
placing said essentially rigid fiber reinforced preform and a deformable plastic material in a mold;
molding said essentially rigid fiber reinforced preform and said deformable plastic material together to form an article comprising said plastic material with said fibers contained therewithin as a reinforcement; and
removing said fiber-reinforced plastic article from said mold.

11. A method according to claim 10, wherein:
said reinforcing fibers are precoated with said microwave curable composition prior to being applied to said preform mold surface prior to exposure to said microwave energy.

12. A method according to claim 10, wherein:
said preform mold surface comprises a microwave-energy transparent material having a shape conforming to that of the preform to be molded.

13. A method according to claim 10, wherein:
said preform mold surface comprises a mandrel around which said fibers are deposited.

14. A method of making a rigid fiber reinforcement preform for use in making fiber-reinforced molded articles comprising:
(a) applying a layer of reinforcing fibers on a preform mold surface which has a configuration corresponding to at least a portion of a final molded article;
(b) coating said fibers with a microwave-curable composition to a degree sufficient to coat said fibers without filling interstices among said fibers;
(c) exposing said coated fibers to microwave energy to cure substantially all of said composition to form an essentially rigid preform; and
(d) removing said resulting preform from said preform mold surface.

15. A method according to claim 14, wherein:
said reinforcing fibers are pre-coated with said microwave-curable composition prior to being applied to said preform mold surface and prior to exposure to said microwave energy.

16. A method according to claim 14, wherein:
said preform mold surface comprises a material which allows microwave energy to pass therethrough having a shape conforming to that of the preform to be molded.

17. A method according to claim 14, wherein:
said preform mold comprises a mandrel around which said fibers are deposited.

* * * * *